(No Model.)
J. HOOD & S. H. REYNOLDS.
BUSH HAMMER.
No. 267,788. Patented Nov. 21, 1882.
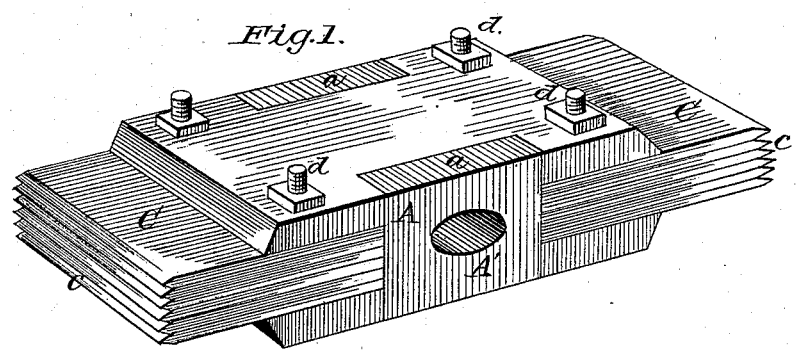
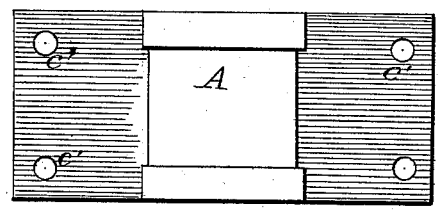
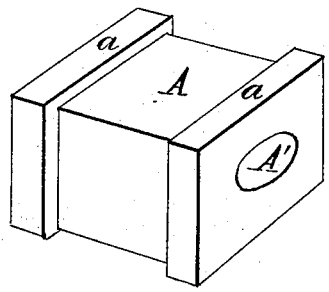
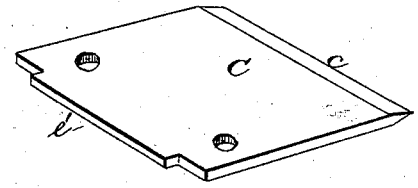
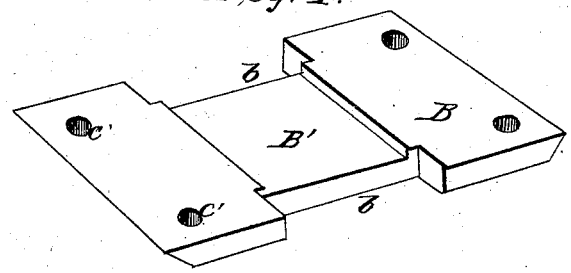
WITNESSES:
Fred. G. Dieterich.
J. G. Hinkel
INVENTORS
John Hood
Stephen H. Reynolds
by
Robt Vose ATTORNEYS.
N. PETERS, Photo-Lithographer, Washington, D. C.

UNITED STATES PATENT OFFICE.

JOHN HOOD AND STEPHEN H. REYNOLDS, OF BOSTON, MASSACHUSETTS.

BUSH-HAMMER.

SPECIFICATION forming part of Letters Patent No. 267,788, dated November 21, 1882.

Application filed August 3, 1882. (No model.)

*To all whom it may concern:*

Be it known that we, JOHN HOOD and STEPHEN H. REYNOLDS, citizens of the United States, residing at Boston, in the county of Suffolk and State of Massachusetts, have invented certain new and useful Improvements in Bush-Hammers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in that class of stone-cutters' tools commonly known as "bush-hammers," and which are generally constructed by uniting two separate flat pieces of metal, called "jaws" (having a projecting central part which forms the eye for the handle) by means of gibs, which have enlarged heads that clasp the edges of the jaws and form a base upon which the inner end of the series of cuts or steel blades that act upon the stone rest. These "blades" or "cuts," as they are technically called, are further secured in position between the jaws by bolts, which pass through both jaws and cuts and cause the jaws to firmly clasp the cuts. The difficulty experienced with tools of this construction arises from the fact that in use the inner ends of the hardened-steel plates which form the cuts soon wear into the gibs, which, as they have to be heated in order to put them in place, are not hardened, thus causing the whole strain to come upon the bolts, which soon give out, and the tool is rendered useless until it is taken to pieces and new gibs and bolts added. In order to avoid these difficulties we have constructed a bush-hammer in which the eye or handle-socket is a separate and distinct block, which serves the purpose of a handle socket, and also, by means of recesses in its sides into which the jaws enter, fills the place of the gibs used to hold the jaws of the ordinary bush-hammer in position. As this eye-block is a separate and distinct piece of steel, it may be hardened, so that the inner ends of the cuts cannot wear it to any appreciable extent, thus saving the bolts which unite the jaws from destructive wear, and causing the implement, as a whole, to possess much greater durability.

The invention may therefore be said to consist in the peculiar construction of the central block which forms the handle-socket, and in the combination and arrangement, in connection therewith, of the other parts of the tool, as will be hereinafter described, and specifically set forth in the claims.

In the accompanying drawings, Figure 1 is a perspective view of the tool complete. Fig. 2 is a sectional plan, the jaw being removed from one side. Fig. 3 is a perspective view of the block which forms the handle-socket. Fig. 4 is a similar view of one of the jaws, and Fig. 5 shows one of the cuts removed from the tool.

A represents the handle-socket, which consists of a rectangular block of steel grooved or recessed on four sides, and pierced by a hole, A', which is intended to receive the handle. This socket, after receiving the proper form, is preferably hardened, so as to bear the blows of the cuts without being quickly worn or upset, as it would be were it left soft or formed of iron. The jaws B are also preferably made of steel, but do not require hardening, as they are not exposed to the direct blows of the cuts, as are the blocks A. These jaws are provided with recesses $b$ on each side, which embrace the projecting flanges $a\ a$ of the block. An additional recess, B', is formed in the inner face of each jaw, which receives the broad surface of two sides of the block between the flanges $a\ a$.

It will thus be seen that when the jaws are in place upon opposite sides of the block the latter takes the place of the gibs in the tool as ordinarily constructed, holding the jaws firmly in place. Holes $c'\ c'$ are formed in the opposite ends of the jaws for the passage of the bolts $d\ d$, which, when the parts are all in place, are passed through them, and serve to hold them firmly in their proper position with relation to each other.

The cuts C are rectangular plates of steel, having one side, $c$, brought to a comparatively-sharp cutting-edge, and its opposite side provided with a projecting tongue, $e'$, which enters the recess formed by the flanges upon the ends of the block A, thereby preventing lateral displacement. These cuts are also pierced with holes for the reception of the bolts $d\ d$, by which they are firmly held between the jaws and are prevented from being withdrawn therefrom. These cuts, after they have received the desired form, are properly tempered and are then ready for use.

It will be seen that the jaws, as well as the cuts, are interchangeable, thus affording the greatest facility for repair, so that if any part of the tool should be broken it could immediately be replaced by a new piece, enabling the workman to always keep his tool in effective condition without incurring the delay of sending it to the shop for repair.

We are aware that bush-hammers have been heretofore constructed in which the jaws and socket-block were formed of two pieces of metal, one-half the handle-orifice being made in each piece and the two united by bolts. We are also aware that they have been constructed by forming the socket-block and one jaw in a single piece, the other jaw being movable and the two parts clamped together by bolts. We do not therefore claim these methods of construction.

Having thus described our invention, we claim as new and desire to secure by Letters Patent the following:

1. In combination with the jaws and cuts of a bush hammer, the socket-block A, formed of hardened steel and provided with a handle-orifice, A', and flanges $a\ a$, surrounding it at each end to receive the jaws and cuts, substantially as shown and described.

2. In combination with the socket-block and cuts of a bush-hammer, the jaws B, having bolt-holes $c'\ c'$, recesses B' to receive the sides of the socket-block, and recesses $b\ b$ in their edges to receive the flanges thereof, all arranged in the manner shown and described.

3. The combination, in a bush-hammer, of the socket-block surrounded at each end by flanges $a\ a$, the recessed jaws embracing said block and its flanges, and the series of cuts C C, placed between the jaws, all the parts being held firmly in position by the clamping-bolts $d\ d$, substantially as and for the purpose set forth.

In testimony whereof we affix our signatures in presence of two witnesses.

JOHN HOOD.
STEPHEN H. REYNOLDS.

Witnesses:
  JOHN MAY,
  H. KEENAN.